Patented July 18, 1939

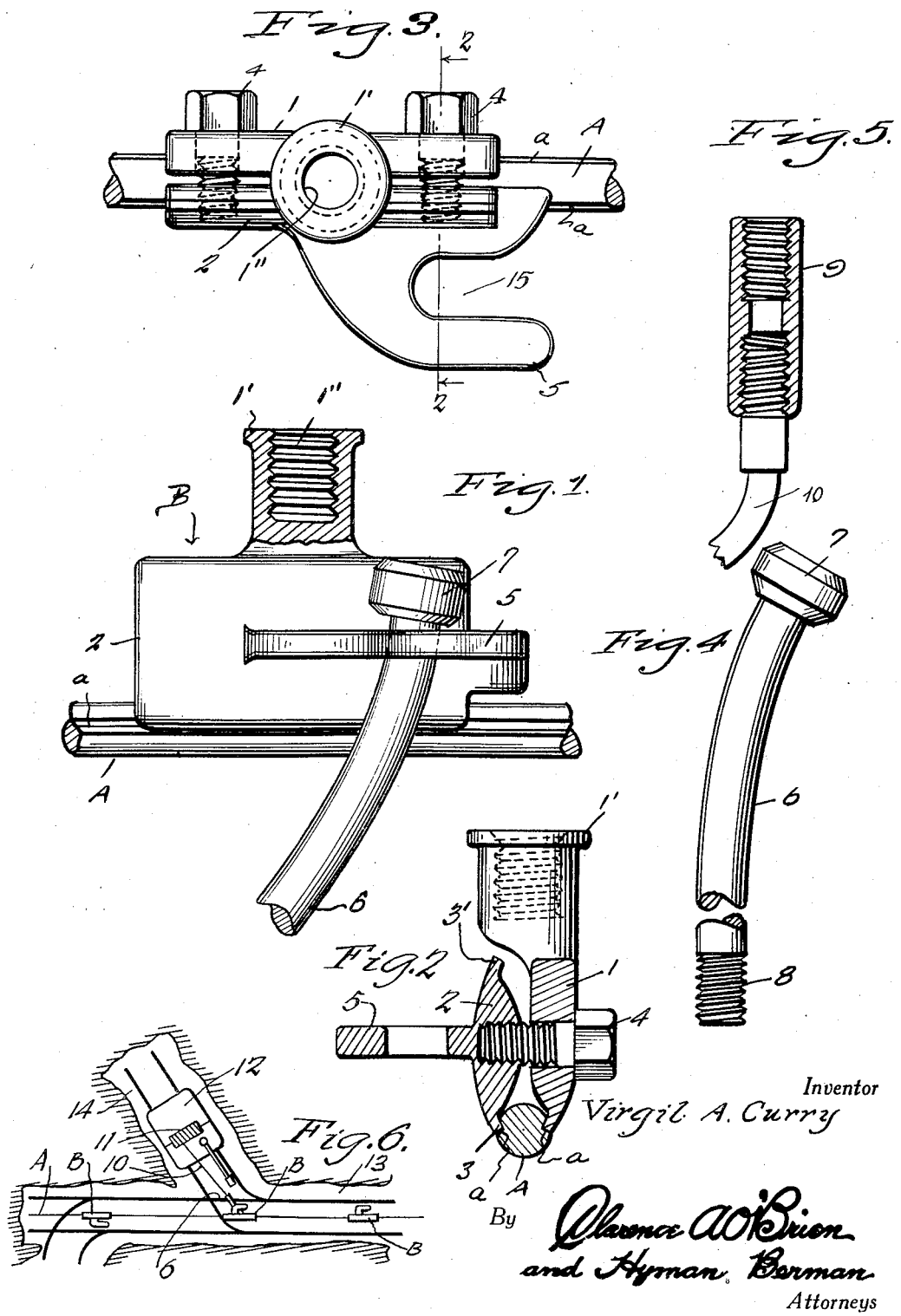

2,166,656

UNITED STATES PATENT OFFICE 2,166,656

TROLLEY WIRE TAP WITH ANCHOR CLAMP

Virgil A. Curry, Dehue, W. Va.

Application March 26, 1938, Serial No. 198,207

11 Claims. (Cl. 191—12)

The invention is a device used for connecting trailing cable of reel locomotive to mine trolley wire.

I am aware that prior to my invention trolley taps with hook formed at end have been used; but I claim a new tap which eliminates the hazardous features of the hook, due to the nature of the hook to hang to the trolley wire when operator attempts to remove same from wire or while operator is sliding tap along trolley wire while moving locomotive short distances. Many fatal and serious accidents to operators have been caused by the hook hanging to the trolley wire, and to prevent these accidents is the motive of my invention.

One form of the invention is shown in the accompanying drawing in which:

Figure 1 is an elevation of the invention with part of the trolley wire clamp in section and the tap or shank, to which the cable is connected.

Figure 2 is a partial section on the line 2—2 of Figure 3.

Figure 3 is a top plan view of Figure 1 without the tap.

Figure 4 is a view of the tap or shank.

Figure 5 is a sectional view through a sleeve which is used for connecting the tap or shank with the cable.

Figure 6 is a diagrammatic view of my invention showing the relation of the parts.

In this drawing the trolley wire is shown at A and the improved clamp is shown at B. This clamp is composed of the jaws 1 and 2 each of elongated form and having their lower ends provided with the lips 3 for gripping the grooves $a$ in the trolley wire, as shown more specifically in Figure 2. The two jaws are connected together by the bolts 4 so that they will grip the wire and the jaw 1 is formed with a centrally arranged upwardly extending part 1' which is provided with a threaded bore 1'' for receiving a threaded stud on a hanger which supports the clamp from the ceiling of the mine shaft. The jaw 2 is formed with a horizontally arranged hook 5 on its outer face and in order to permit this hook to extend either to the right or left I provide the jaw 2 with a second lip 3' at that edge opposite the edge which carries the lip 3 so that the jaw 2 can be reversed.

A shank or cable tap 6, of the curved construction shown in Figure 4 has a head 7 at its upper end, beveled at its top and bottom as shown in Figure 4 and the lower end of the shank or tap is provided with a threaded portion 8 fitting in a threaded end portion of the sleeve 9, shown in Figure 5, the other end of the sleeve being threaded to receive the cable 10 which is attached to a reel 11 of the locomotive 12. It is to be understood, however, that this cable can be attached to the lower end of the tap or shank 6 in any suitable manner.

Thus when it is desired to move the locomotive from a main entry 13 having the trolley wire A passing therethrough to a side entry 14 or chamber not provided with the trolley wire, the shank or tap 6 has its upper end portion placed in the slot 15 of the hook 5, as shown in Figure 1, so that current will continue to flow to the motor of the locomotive, after the trolley wheel leaves the trolley wire A, through the clamp B, shank or tap 6 and the cable to the motor of the locomotive. The clamp B, or any number of them, may be located along the trolley wire wherever convenient to the side openings.

In Figure 1 the parts are arranged to permit movement of the locomotive either to the left or in a lateral direction relative to the trolley wire but when the locomotive is to be moved to the right or laterally to the trolley wire the jaw 2 is reversed so that the opening formed by the jaw will extend to the left.

As will be seen the tap or shank 6 will be securely held by the hook 5 to the clamp B while the locomotive is moving in a direction away from the trolley wire but the shank or tap can be easily detached from the clamp when the locomotive returns to a point where the trolley wheel of the locomotive can be readily contacted with the trolley wire. Also the specific form of tap or shank shown provided with the head 7 can be safely used as a glider along the trolley wire while moving the locomotive short distances, commonly called "nipping locomotives".

It is thought from the foregoing description that the advantages and novel features of the invention will be readily apparent.

It is to be understood that changes may be made in the construction and in the combination and arrangement of the several parts provided that such changes fall within the scope of the appended claims.

I claim:

1. Means for electrically connecting a cable to a trolley wire comprising a supporting member for the trolley wire, a hook carried by the supporting member and provided with a slot open above, below and at one end, a headed shank connected with the cable and having its headed end mounted in the slot and the head supported by the hook, the head comprising a knob like member positioned adjacent an end of the shank and supporting the shank in freely movable relation to the hook.

2. In an electrical system, in combination, a trolley wire, a plurality of spaced clamps intermediate the ends of the trolley wire and attached to the trolley wire to support the wire, an electrically operated vehicle, a reeled cable having one end connected to the vehicle for supplying current thereto to operate the vehicle, a projection provided with an elongated slot extending substantially parallel to the trolley wire, associated with each clamp and electrically connected to the trolley wire, each slot open at one end, an elongated contact member having one end electrically connected to the other end of the cable, the contact member positioned in the slot of one of the said hooks and enlarged means on the other end of the terminal to prevent the removal of the contact member from the hook in a direction substantially at right angles to the trolley wire, the engagement of the contact member with the hook being maintained by the pull of the cable upon the contact member, at right angles to the trolley wire.

3. Means for electrically connecting a cable to a trolley wire comprising a clamp provided with a pair of elongated jaws to grip the trolley wire and means to attach the jaws to a support, means projecting laterally from one jaw and having an elongated slot open at one end, the slot extending substantially parallel to the longitudinal axis of the jaws and means for electrically connecting the cable to the supporting means comprising an elongated contact member with means at one end for the attachment of a cable thereto and the other end of the contact member removably positioned in said slot and provided with means to prevent removal from the slot except longitudinally through said opening.

4. Means for electrically connecting a cable to a trolley wire comprising in combination a trolley wire support and a contact member adapted to be placed in removable engagement therewith, the said support adapted to engage the trolley wire and having means for attachment to a second support and also having a slotted member open at one end to slidably receive the contact member, the contact member having an enlarged head permitting the contact to be slid along the trolley wire without catching on the wire and its fittings and to retain the contact in position in the slot of said slotted member until removed from the slot of said slotted member through the said open end and means to attach the cable to the contact member.

5. In a power system for delivery of current to an electrically operated vehicle, in combination, a trolley wire, an attachment to the trolley wire arranged to clamp to the wire intermediate its ends and support the wire and provided with a hook having an elongated slot open at one end positioned above the trolley wire, an electically operated mechanism to receive its power from the trolley wire, a cable for electrically connecting the mechanism to the trolley wire, an interposed contact member having one end of the cable electrically connected thereto, the member adapted to be positioned in said slot and also slid along the trolley wire in contact therewith while manually held, means on the member to guide the member against displacement while moved along the trolley wire, the said means so constructed as to prevent the contact being hooked onto the trolley wire but to releasably hold the contact positioned within said slot.

6. An attachment for making a connection with a trolley wire comprising, a pair of jaws arranged to grip the wire, means to support the jaws, means formed integral with and projecting laterally from at least one jaw and provided with an elongated slot having an open top and bottom and open at one end to receive a cable tap in removable relation to the attachment and permit the tap to hang below the supporting means freely movable relative thereto.

7. A contact clamp for attachment to a trolley wire comprising, a pair of metallic jaws, means for holding the jaws assembled in clamping relation with the trolley wire, means projecting from the clamp and forming a longitudinal slot closed only at one end to slidably receive through the open end of the slot a cable tap provided with means to engage the projecting means whereby the tap is loosely supported in a suspended position substantially below the clamp.

8. A clamp for attachment to a trolley wire comprising a pair of elongated jaws arranged to grip the wire and a contact support projecting from the side face of at least one jaw intermediate the longitudinal edges of the jaw, the support having a slot open at one end and through which opening a cable contact may be passed and be supported by the said support, the said one jaw being reversible end for end whereby the open end of the slot may be reversed relative to the clamp.

9. Means for electrically connecting a cable to a trolley wire clamp comprising a supporting member for the trolley wire, said member including a stationary jaw and a movable jaw, means for connecting the movable jaw to the stationary jaw and move the jaws into clamping engagement with the trolley wire, a hook associated with one jaw, the hook provided with an open end slot, a headed cable tap connected with the cable and having its headed end supported by the hook in movable relation to the support, the said slot and hook being so constructed and positioned with respect to each other and to the support that the slot will receive the tap when held substantially vertical and moved longitudinally into the slot through its open end and the hook will support the tap by its head.

10. Means to electrically connect a cable to a trolley wire and to support the trolley wire comprising a pair of jaws, one of the jaws being stationary and the other jaw being reversible end for end, means for connecting the reversible jaw to the stationary jaw and to move the jaws into clamping engagement with the trolley wire, a longitudinally slotted shelf closed only at one end and projecting laterally from the reversible jaw and having a headed cable tap connected with the cable and slidably positioned in the slot with the head supported by the shelf, the construction and arrangement of the reversible jaw relative to the stationary jaw and of the shelf and slot relative to the reversible jaw being such that the reversible jaw may be turned end for end and the trolley wire may be clamped between the jaws and the headed cable tap positioned in the slot with the head supported by the shelf when the reversible jaw is in either position.

11. The combination with a support for a trolley wire and cable tap comprising a clamp provided with a pair of jaws each having means cooperating with like means on the other jaw to engage and grip a trolley wire and means to move the jaws into holding engagement with the wire and also having means for attaching the jaws to a support, of projecting means associated with the clamp and having an elongated slot closed at one end and open at the opposite end whereby a headed cable tap may be manually passed through the open end of and positioned in, the slot with the head supported by the projecting means with the tap hanging freely in a substantially vertical position.

VIRGIL A. CURRY.